United States Patent [19]

Kogure et al.

[11] 4,421,080
[45] Dec. 20, 1983

[54] COMBUSTION CHAMBER FOR INTERNAL COMBUSTION ENGINE

[75] Inventors: Katsushige Kogure, Higashimatsuyama; Kenzo Suzuki, Fujimi; Masami Kamimura, Niiza, all of Japan

[73] Assignee: Honda Giken Kogyo Kabushiki Kaisha, Tokyo, Japan

[21] Appl. No.: 283,113

[22] Filed: Jul. 13, 1981

[30] Foreign Application Priority Data

Jul. 26, 1980 [JP] Japan .................. 55-101867

[51] Int. Cl.³ ............................. F02B 23/00
[52] U.S. Cl. ................ 123/306; 123/193 H
[58] Field of Search ......... 123/262, 263, 188 M, 123/306, 193 R, 193 CH, 193 H, 657, 659, 661, 671

[56] References Cited

U.S. PATENT DOCUMENTS

| | | | |
|---|---|---|---|
| 1,866,703 | 7/1932 | Gehres | 123/306 |
| 2,472,117 | 12/1945 | McGowen et al. | 123/306 |
| 2,622,579 | 1/1948 | Weslake | 123/657 |
| 3,766,900 | 10/1973 | Aiti | 123/657 |
| 4,183,343 | 1/1980 | Tanahashi et al. | 123/193 H |
| 4,201,175 | 5/1980 | Tanaka et al. | 123/657 |
| 4,224,918 | 9/1980 | Tanaka et al. | 123/657 |
| 4,291,655 | 9/1981 | Yamakawa | 123/306 |
| 4,354,463 | 10/1982 | Otani et al. | 123/308 |

FOREIGN PATENT DOCUMENTS

| | | | |
|---|---|---|---|
| 52-77907 | 6/1977 | Japan | 123/659 |
| 604997 | 8/1948 | United Kingdom. | |
| 640734 | 7/1950 | United Kingdom. | |

Primary Examiner—Craig R. Feinberg
Assistant Examiner—W. R. Wolfe
Attorney, Agent, or Firm—Lyon & Lyon

[57] ABSTRACT

A combustion chamber is provided with a suction port and an opening for reception of an ignition plug. A curved swirl guide wall partially encircles the periphery of the suction port and projects into the combustion chamber, the opening being located on the opposite side of the swirl guide wall from the suction port and adjacent thereto. A flame guide recess of decreasing depth extends from the opening in the downstream direction of the swirl.

1 Claim, 4 Drawing Figures

COMBUSTION CHAMBER FOR INTERNAL COMBUSTION ENGINE

This invention relates to a combustion chamber for an internal combustion engine of the type employed in vehicles and other applications.

Combustion chamber designs are known which accommodate a suction port, an exhaust port, and a spark plug all arranged in or on a ceiling wall of a combustion chamber. It is also known to include a guide wall at one side of the suction port to cause swirling of air or air-fuel mixture from the suction port.

However, this arrangement not only causes limited spreading of the flame produced by the spark plug, but also frequent knocking. More specifically, during the compression stroke of the engine piston, there occurs an eddy flow of gas being compressed. This eddy flow travels toward the spark plug to adversely affect the spreading of the flame produced by the plug. Further, since fluid in the vicinity of the guiding wall burns at a time near the end of the combustion cycle, and the zone in the vicinity of the guiding wall is relatively small in volume, knocking may occur.

A principal object of the present invention is to provide a combustion chamber which is free of the above-mentioned disadvantages.

According to this invention, there is provided a combustion chamber together with a suction port, an exhaust port and a spark plug, all arranged in or on a ceiling wall of a combustion chamber having a substantially semispherical shape. A curved air swirling and guiding wall is provided at a lateral side of the suction port and extending continuously from the suction port in a manner forming an extension thereof. The spark plug is arranged at a location near the guiding wall, and a flame guide recess is formed in the ceiling wall and extending from the spark plug in a direction downstream of the swirl.

Other and more detailed objects and advantages will appear hereinafter.

Figure 1:
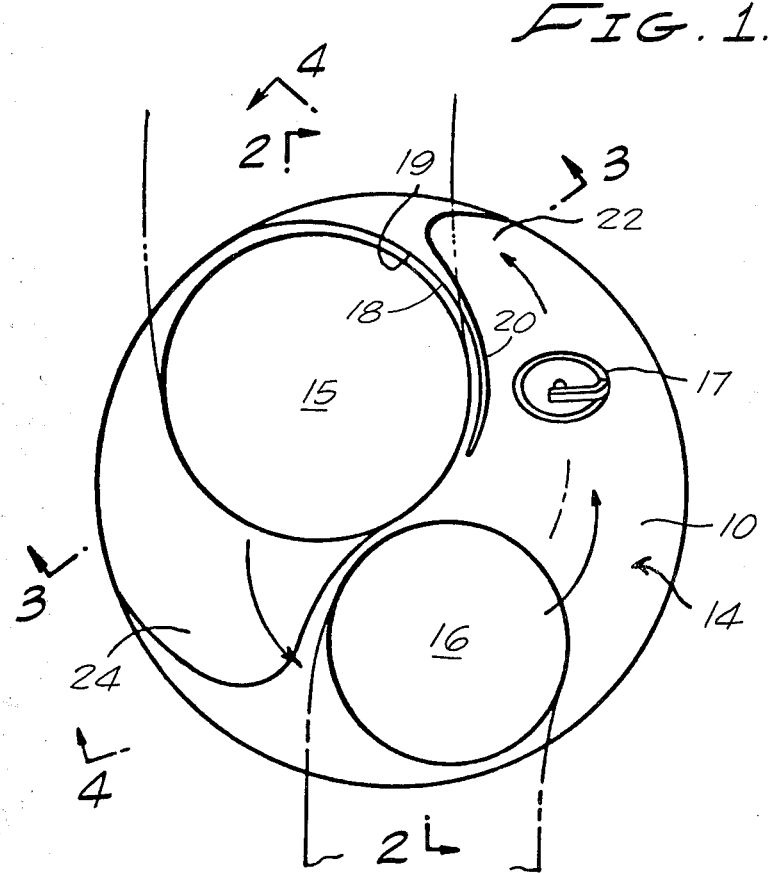
FIG. 1 is a bottom plan view of a combustion chamber for an internal combustion engine, showing a preferred embodiment of this invention.
Figure 2:
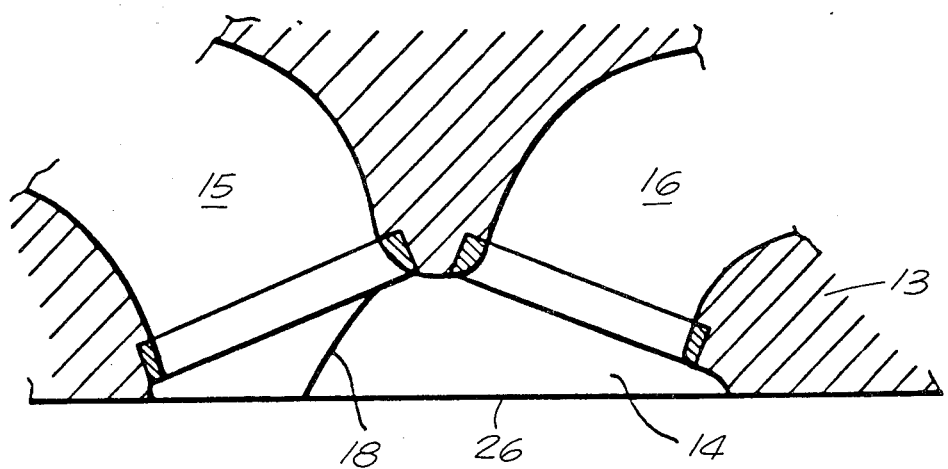
FIG. 2 is a section view taken substantially on the lines 2—2 as shown in FIG. 1.

Referring to the drawings, the internal combustion engine has a cylinder block provided with a cylinder bore 11 in which a piston 12 reciprocates. The cylinder head 13 is provided with a generally semispherical combustion chamber 14. By generally semispherical it is meant that the shape of the combustion chamber is part of a sphere, generally speaking, but not as complete as a hemisphere. Extending through the ceiling wall 10 of the combustion chamber 14 are a suction port 15 and an exhaust port 16 placed in substantially diametric opposite locations, as shown in FIG. 1.

A curved swirl guide wall 18 partially encircles the periphery of the suction port 15 and has a concave surface 19 serving as an extension of the suction port 15. The convex surface 20 on the other side of the swirl guide wall 18 extends laterally between the ignition plug opening 17 and the suction port 15. Suction air of air-fuel mixture is guided along the curved swirl guide wall 18 so that a swirl of air or air-fuel mixture is produced in a counterclockwise direction as shown by the arrows in FIGS. 1 and 3. The extending edge 21 of the guide wall 18 is coplanar with the mating surface 26 of the cylinder head 13.

Figure 3:
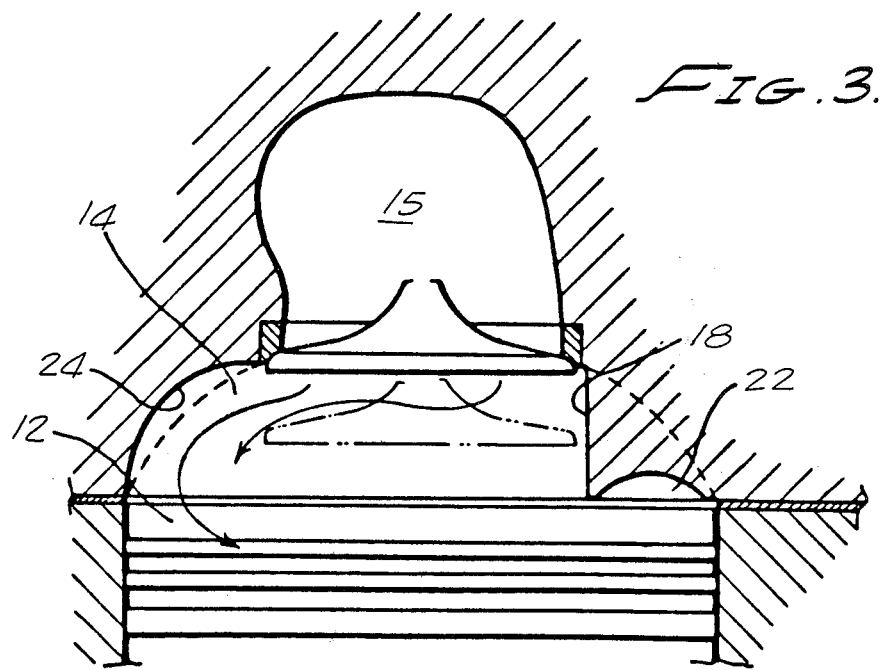
FIG. 3 is a section view taken substantially on the lines 3—3 as shown in FIG. 1.
Figure 4:
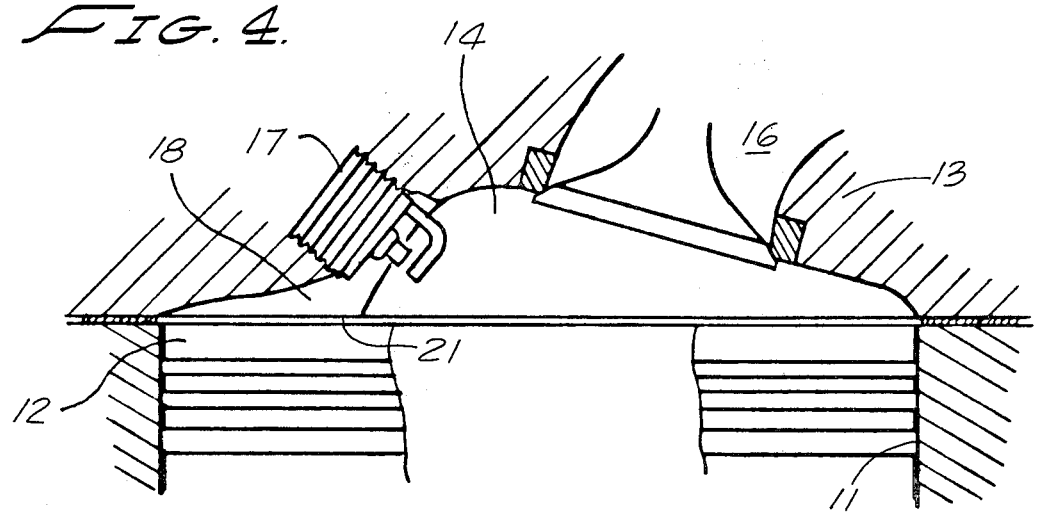
FIG. 4 is a section view taken substantially on the lines 4—4 as shown in FIG. 1.

The spark plug opening 17 is located near the convex surface 20 of the curved swirl guide wall 18. Adjacent the convex surface 20 and in the downstream direction of the swirl is formed a flame guiding recess 22 of diminished depth. A deeper recess 24 is formed in the ceiling wall 10 of the combustion chamber 14 at a location downstream from the suction port 15, as shown in FIGS. 1 and 3. Incidentally, the configuration of a conventional combustion chamber is illustrated by the dashed lines in FIG. 3.

In operation, suction air or air-fuel mixture is guided into the combustion chamber 14 along the concave surface 19 of the curved swirl guide wall 18 to cause swirling in the direction of the arrows. Flame caused by ignition of the spark plug passes rapidly through the flame guiding recess 22 downstream of the spark plug. The convex surface 20 of the swirl guide wall 18 cooperates with the decreasing depth of the flame guiding recess 22 to cause a swirl in the combustion chamber 14. Therefore, spreading of the flame is not impeded by the eddy flow caused by the configuration of the curved swirl guide wall 18. In addition, fluid in a small volume zone in the combustion chamber 14 is first burned at the beginning of combustion, thus reducing the possibility of knocking which might otherwise occur toward the end of the combustion cycle.

The construction of the device embodying the present invention permits flame caused by ignition of the spark plug to be rapidly guided to the zone in the vicinity of the guiding wall and passed therethrough, thus resulting in good spreading of the flame as well as reducing the possibility of knocking. Therefore, generally improved combustion efficiency and reduced fuel consumption are achieved by the present invention.

Having fully described our invention, it is to be understood that we are not to be limited to the details herein set forth but that our invention is of the full scope of the appended claims.

We claim:

1. A combustion chamber construction for an internal combustion engine having a cylinder head, comprising, in combination: a ceiling wall in the cylinder head forming a combustion chamber, a suction port and an exhaust port in the cylinder head both communicating with the combustion chamber, a curved swirl guide wall partially encircling the periphery of said suction port and projecting from the ceiling wall into the combustion chamber, an opening in the ceiling wall for reception of an ignition plug, said opening being located on the opposite side of the curved swirl guide wall from said suction port, said curved swirl guide wall acting to cause fluid entering said combustion chamber from said suction port to swirl in a direction to pass the exhaust port and said opening in that sequential order, said ceiling wall having a flame guide recess extending with decreasing depth from said opening in the downstream direction of the swirl and toward said curved swirl guide wall.

* * * * *